Nov. 2, 1965        J. D. GROVES        3,215,496

PROCESS FOR PRODUCING METAL OXIDES

Filed Dec. 7, 1960        3 Sheets-Sheet 1

INVENTOR
JAMES DENNIS GROVES

Oscar L. Spencer
ATTORNEY

Nov. 2, 1965  J. D. GROVES  3,215,496
PROCESS FOR PRODUCING METAL OXIDES
Filed Dec. 7, 1960  3 Sheets-Sheet 2

INVENTOR
JAMES DENNIS GROVES

ATTORNEY

INVENTOR.
JAMES DENNIS GROVES 3,215,496
PROCESS FOR PRODUCING METAL OXIDES
James Dennis Groves, Stockton-on-Tees, England, assignor to British Titan Products Company Limited, Billingham, England, a company of Great Britain
Filed Dec. 7, 1960, Ser. No. 74,399
Claims priority, application Great Britain, Dec. 9, 1959,
41,930/59
2 Claims. (Cl. 23—202)

The present invention relates to the vapour-phase oxidation of metal or metalloid halides to the corresponding oxides utilising the fluidised bed technique.

The fluidised bed technique is one which is described, inter alia, in the specifications of our British Patent No. 761,770 and U.S. application Serial Number 721,579, now U.S. Letters Patent 3,043,657. The technique broadly involves feeding oxygen and the halide into a fluidised bed of inert particles. The bed is maintained at a suitably elevated temperature (e.g. between 600 and 1300° C.) so that the incoming feed of oxygen and halide will be heated to the reaction point producing chlorine and the oxide corresponding to the halide. It is desirable that as much as possible of the oxide reaction product is discharged from above the bed in the outgoing gases so as to facilitate its collection. It follows from this that every effort should be made to reduce accretion of the oxide product on the inert particles of the fluidised bed, which accretion causes the oxide to be retained in the bed and prevented from being discharged with the outgoing gases to the collection apparatus.

The accretion of the oxide reaction product on the inert particles of the fluidised bed is a very distinct problem in the fluidised bed technique under commercial scale operation. Not only does it reduce the ready yield of oxide from the outgoing gases, but it also enlarges the inert particles and makes it progressively more difficult to maintain them in the fluidised state. Thus periodically one has to withdraw the oxide coated particles and replace them with uncoated particles.

It is the prime object of the present invention to reduce the accretion of the oxide product on the inert particles of the fluidised bed.

It has now been surprisingly discovered that accretion of the oxide product on the inert particles can be reduced if one causes the oxygen and halide to react substantially instantaneously when they come into contact with each other, and that this can be effected by pre-heating one or both of these gases to the degree required to cause such instantaneous reaction. If there is no pre-heating of the oxygen and halide to this degree before they come into contact in the fluidised bed, complete reaction will be delayed while the reactant gases are being brought up to reaction temperature by the heat of the bed. It seems that the slower the reaction the greater the likelihood of the oxide product being deposited upon the inert particles of the bed rather than being discharged out of the bed entrained in the outgoing gases.

Accordingly, the present invention provides a method of oxidising at elevated temperature a metal halide or metalloid halide (as herein defined) to the corresponding oxide, which comprises feeding oxygen and the vapour of the halide into a fluidized bed of inert particles for reaction therein and discharging at least most of the oxide product as particles entrained in the effluent gases leaving the bed; one or both of the oxygen and halide vapour being pre-heated before the two gaseous reactants come into a substantial degree of contact with each other, such pre-heating being sufficient to enable the two gaseous reactants to react with each other substantially immediately after they have come into contact.

The term "oxygen" is used herein to include oxygen itself or a gas containing at least 15%, preferably more than 50%, molecular oxygen.

Examples of the metals or metalloids herein concerned are titanium, aluminium, zirconium, hafnium, tin, iron, antimony, chromium, tungsten, niobium and tantalum. The present invention is particularly useful for the production of oxide pigments, and a major application of the invention is the oxidising of titanium tetrachloride to titanium dioxide.

The halides herein concerned are chlorides, bromides or iodides.

In the most desirable method of operating the fluidised bed technique, it is so arranged that, after reaction has been initiated, the reaction is maintained autothermally, that is, without the supply of any form of external heat and using the bed as a heat reservoir to maintain continuous reaction. This is desirable with the present invention wherein it is also desirable to utilise the heat of the bed to effect the pre-heating of the present invention.

Numerous means of pre-heating can be devised once one realises the objective taught by the present invention, namely to cause the oxygen and the halide to react substantially instantaneously as soon as they come into contact. Thus, in one method of pre-heating, both the oxygen and the halide are each separately pre-heated to substantially the reaction temperature concerned; for example, the normal reaction temperature for reaction between oxygen and titanium tetrachloride to produce titanium dioxide is between 800° C. and 1300° C. and, in accordance with the present invention, both reactant gases may be separately pre-heated to a temperature substantially within this range.

In another method of operating the present invention, one of the reactant gases can be pre-heated to a greater extent than the other. Thus, one gas may be pre-heated to a temperature below the desired reaction temperature and the other gas may be heated to above the desired reaction temperature so that the gases will still react substantially instantaneously after coming into contact. Following this principle still further, one can obtain the same objective by pre-heating only one of the gases but to such a high temperature that, again, one will obtain substantially instantaneous reaction when the gases contact one another. It should of course be borne in mind here that titanium tetrachloride and other halides will in any event be given some pre-heating in order to vaporise them, the boiling point of titanium tetrachloride being 136° C. which of course is far lower than its reaction temperature with oxygen which is at least 800° C.

As regards the actual method of supplying heat to the gases for effecting pre-heating thereof in accordance with the present invention, the preferred method is to allow one or both gases to contact the hot particles of the bed for an appreciable amount of time before the gases contact one another. Means may be provided to maintain the gaseous reactants separate after admission into the bed, until at least one of them has been preheated to the required degree. For example, if one desires to pre-heat both of the reactant gases, a suitable method is to provide partitions between the feed inlets of the respective gases in order to prevent the gases contacting one another until after they have travelled beyond the bounds of the partition, by which time they will have had appreciable contact with the hot particles of the bed and will have been pre-heated to an extent determined by the size of the partitions. The reactant gases are normally fed through upwardly-directed inlets in a perforated plate (or block) located at the base of the reaction chamber. In such a case, vertical partitions can be provided between the feed inlets of the respective gases, the height of the partitions being so gauged as to allow the required pre-heating of the reactant gases before they come into contact immediately above the partitions.

A method of pre-heating either one or both of the reactant gases is to countersink upwardly-directed feed inlet passages at the bottom of the reaction chamber so as to form recesses or pockets at the top of the passages, which recesses or pockets will be wider than the passages themselves and will allow hot particles of the bed to fall downwardly therein. This will ensure that the gases fed upwardly through the passages will be pre-heated by the hot particles in the recesses before they emerge into the main body of the reaction chamber and meet each other for reaction. In this case, of course, the depth of the recesses will have to be gauged so as to effect the required degree of pre-heating. If only one of the reactant gases is required to be pre-heated, then of course one would countersink only those passages feeding that one reactant gas. Alternatively, where one desires to pre-heat both reactant gases, the feed passages of both gases can be countersunk.

A method of pre-heating one of the reactant gases only is to feed such gas into the fluidised bed at a lower level than that at which one feeds the other gas into the fluidised bed. Thus, one may feed the first gas through a perforated plate at the base of the reaction chamber in the normal way but feed the other gas through an inlet pipe which passes through and projects above the said perforated plate. In this case, the first gas will be pre-heated by the depth of the bed below the tops of the inlet projections of the second gas.

Another method of feeding gases at different levels is to feed one gas upwardly into the base of the chamber but to feed the second gas laterally into the chamber at a higher level; in this case the second gas would provide no upward velocity for fluidising the lower part of the bed, although it might help to fluidise the upper part of the bed. An alternative method is to feed both gases laterally into the chamber at different levels, in which case it would generally be necessary, unless it were desired that the lower part of the bed should remain static, to feed a third gas upwardly into the base of the chamber. This third gas will fluidise the lower part of the bed and assist in fluidising the upper part of the bed. By lower part of the bed, we mean the part of the bed below the lowest level of lateral gas entry, while the upper part of the bed is the part of the bed above such level. Such a third gas would normally be inert to the reaction, but it could be the same as one of the two reactant gases.

The methods of pre-heating the reactant gases using the heat of the bed will thus normally involve passing one or both of the gases up through a certain height of the fluidized bed before being allowed to contact one another for reaction. It has been found that this height of fluidised bed required for effective pre-heating will normally vary from 1 inch to 1 foot, preferably 4 to 8 inches. This presupposes a range of reaction temperature from 600 to 1300° C., preferably 900 to 1200° C.

It is, of course, necessary to ensure that the design of the apparatus is such that the upward velocity of the gas in the pre-heating spaces is not sufficiently high to cause entrainment of the bed particles out of these spaces.

It may be desirable to add to the halide reactant small quantities of one or more other halides so as to modify or condition the oxide product. Such addition may be made to the halide reactant either before or after the latter's entry into the fluidized bed reaction chamber. For example, it may be desirable to add small quantities of aluminium or silicon chloride to titanium tetrachloride.

The invention is illustrated in the accompanying drawings, all showing various forms of gas feed inlet distributors in the base of the reaction chamber. In the drawings.

Figure 1:
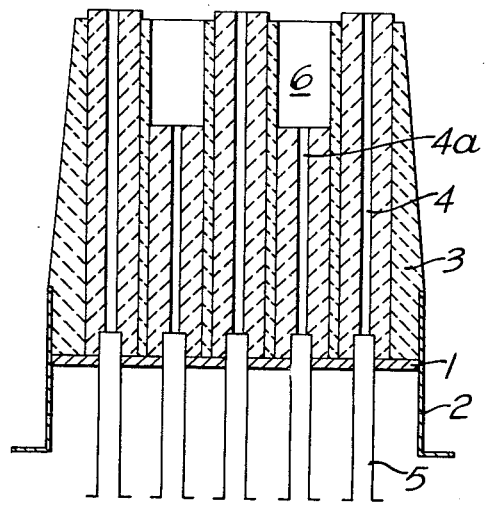
FIGURE 1 illustrates in schematic cross-section the utilisation of countersunk or recessed feed inlet passages.

In the general construction, a base plate 1 in a cylindrical foot support 2 forms the base of the reaction chamber (not shown). Supported on the base plate 1 is a cylindrical perforated ceramic block 3. Tubes 4 are fitted into the perforations in the ceramic block 3. Gas pipes 5 pass through openings in the base plate 1 and are fixed to the lower extremities of the tubes 4. The gases are thus fed through the pipes 5 and the tubes 4 into the reaction chamber above. As a general construction, this so far is a conventional arrangement for the base of a fluidised bed apparatus.

In the particular embodiment shown in FIGURE 1, some of the tubes (designated as 4a) are countersunk or recessed appreciably below the level of the upper surface of the block 3. This forms recesses 6 into which hot inert particles from the bed may fall and thus pre-heat the gas fed through these particular tubes 4a so that such gas will be at the required elevated temperature before contacting the other gas above the level of the upper extremities of the other tubes 4 through which the other gas is fed.

Figure 2:
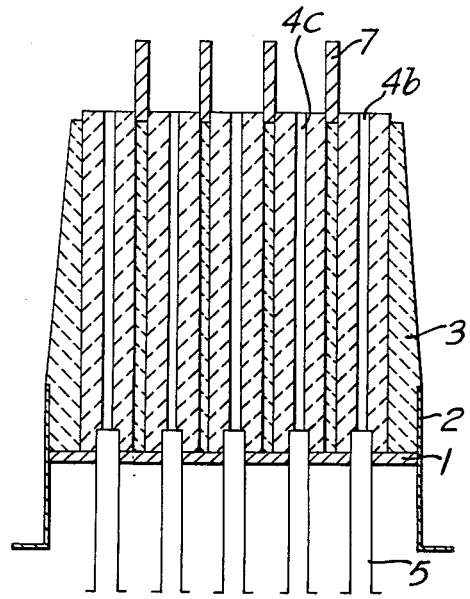
FIGURE 2 illustrates the use of vertical straight partitions and is a schematic cross-section taken on the lines 2—2 of FIGURE 3.

In FIGURE 2, there are provided vertical straight partitions 7 separating the oxygen feed tubes 4b from the halide feed tubes 4c. This separation can be more clearly seen in the plan view of FIGURE 3. The hot particles of the bed will fill the spaces between the partitions 7 and between the outer partitions and the walls of the reaction chamber. The gases will thus be pre-heated in such spaces before contacting one another above the partitions for substantially instantaneous reaction.

Figure 3:
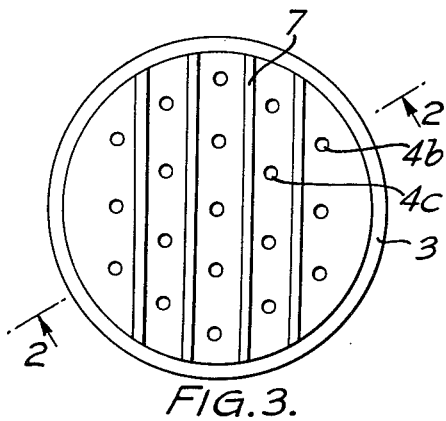
FIGURE 3 is a rough plan view of FIGURE 2.
Figure 4:
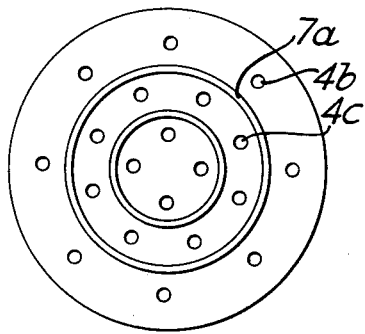
FIGURE 4 is a rough plan view of a similar type of apparatus to that shown in FIGURES 2 and 3 but using annular vertical partitions.

In FIGURE 4, the arrangement is somewhat the same as shown in FIGURES 2 and 3 except that the tubes 4b and 4c are arranged in concentric circles and are separated by concentric annular partitions 7a. The effect of the partitions 7a is the same as the effect of the partitions 7 described above.

Figure 5:
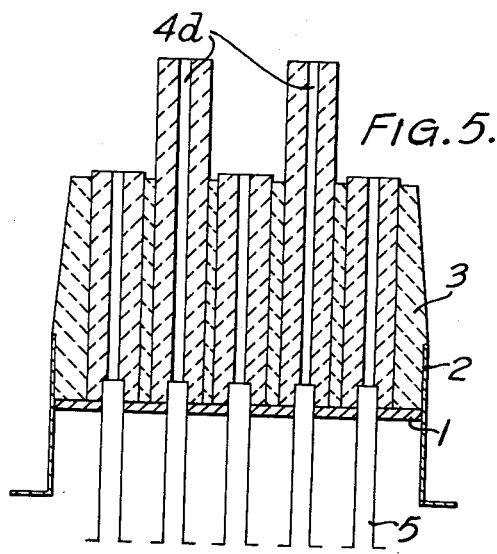
FIGURE 5 illustrates in schematic cross-section the use of upwardly projecting inlet tubes for one of the reactant gases.

In FIGURE 5, some of the tubes (designated as 4d) are arranged so as to project upwardly into the reaction chamber to a level appreciably higher than the level of the upper extremities of the other tubes 4. One gas is fed through the projecting tubes 4d and the other gas is fed through the other tubes 4. By this arrangement, the gas fed through the normal tubes 4 is pre-heated in its upward path through the bed until it reaches the level of the upper extremities of the tubes 4d when it will contact the other gas and react substantially instantaneously.

Figure 6:
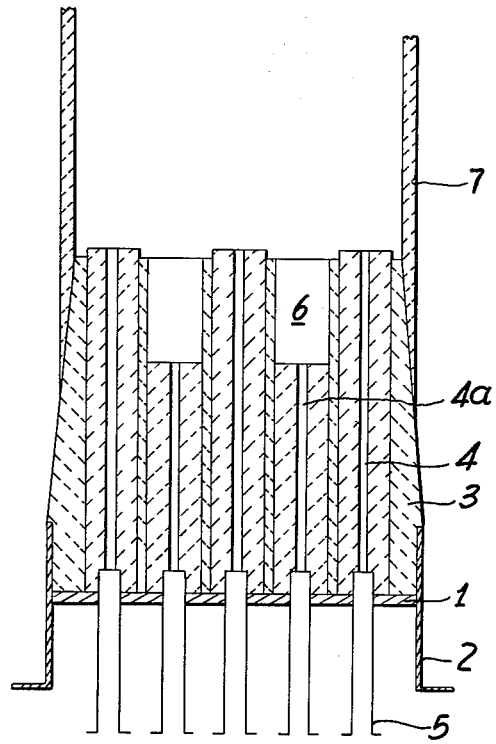

In FIGURE 6, the gas feed inlet distributor base described in FIGURE 1 is shown fitted to cylindrical shaft reaction chamber 7 which is heat insulated. Bed particles may be conveniently deposited therein through the open top and pigmentary titanium dioxide may be recovered therefrom by methods known to the art.

In all figures, the upper ends of the tubes 4, 4a, 4b, 4c and 4d are shown as being open. It may sometimes be advantageous to provide such upper ends with diffuser devices having fine passages through which the gases may flow. A suitable form of diffuser device is a porous disc or plate which may conveniently be dove-tailed into the upper ends of the tubes 4, 4a, 4b, 4c and 4d.

The following example illustrates the invention:

*Example*

A partitioned distributor as illustrated by FIGURE 2 was fitted to the base of a 24" diameter vertical reactor, the distance between the top of the ceramic block 3 and the bed overflow duct (i.e. the height of the bed) being 20″. The height of the partitions was 6″ and the reactant gases gained access to the reactor through simple refractory tubes with open ends.

The reactor was charged with a bed of refractory particles, substantially $TiO_2$, the mean particle size being $320\mu$. The actual weight added was 600 lb.

The bed of particles was pre-heated to about 1100° C. by means of a gas poker, when $TiCl_4$ and $O_2$ were admitted to the distributor at 11.9 lb./min. and 34 c.f.m. respectively. To the oxygen stream was added sufficient water vapour to react with, and produce $TiO_2$ from, 2.6% by weight of the $TiCl_4$; and the $TiCl_4$ feedstock contained 0.013% by weight Si as $SiCl_4$. Under these conditions, the reactor operated smoothly and uniformly at a temperature of about 1000° C. for 4 hours, when the reaction was stopped.

The product collected was of good quality, i.e. contained 90%–95% by weight rutile with a tinting strength of 1500–1550 and constituted 74% of the theoretical weight of the product calculated from the amount of $TiCl_4$ fed to the reactor. Thus the amount retained by the bed was 26% by weight.

Using the same reactor, but with no partitions in the distributor, and adopting the same conditions of flow, temperature etc., it was found that no less than 35% by weight of the total theoretical product was retained by the bed.

What is claimed is:

1. In a process for producing an oxide of a metal selected from the group consisting of titanium, aluminum, zirconium, hafnium, tin, iron, antimony, chromium, tungsten, niobium, and tantalum by the reaction of a halide of said metal with oxygen, said halide being selected from the group consisting of chloride, bromide, and iodide, wherein said reaction is conducted in a reactor containing a fluidized bed of hot inert solid particles maintained above the temperature of reaction of said oxygen and halide, and wherein a proportion of the total metal oxide produced is entrained in the effluent gases leaving the bed and a proportion is accreted on the inert particles, the improvement which comprises increasing the proportion of the metal oxide entrained in the gases and decreasing the accretion on the particles by providing a plurality of adjacent pockets in the bottom of the reactor, each pocket being in direct communication with the bed and large enough to accommodate the hot particles thereof, feeding metal halide reactant into a lower portion of some of said pockets and oxygen in the lower portion of other of said pockets such that the halide and oxygen reactants are maintained substantially out of contact until at least one of the reactants has been heated by direct contact with the fluid bed to a temperature sufficient to react instantaneously upon contact with the other reactant.

2. In a process for producing titanium dioxide by the vapor phase reaction of oxygen and a titanium tetrahalide selected from the group consisting of titanium tetrachloride, titanium tetrabromide, and titanium tetraiodide, within a reactor containing a fluidized bed of hot inert particles maintained above the temperature of reaction of said oxygen and tetrahalide, wherein a proportion of the titanium dioxide produced is entrained within effluent gases leaving the bed and a proportion is accreted onto the inert particles, the improvement which comprises increasing the proportion of the titanium dioxide entrained in the effluent gases and decreasing the proportion accreted onto the particles by providing a plurality of adjacent pockets in the bottom of the reactor, each pocket being in direct communication with the bed and large enough to accommodate the hot particles thereof, feeding titanium tetrahalide reactant into a lower portion of some of said pockets, and maintaining said reactants out of contact until at least one reactant is heated by direct contact with the bed particles to a temperature sufficient to produce a reactants' mixture of at least 800° C. such that the reactants instantaneously react upon mixing.

References Cited by the Examiner

UNITED STATES PATENTS

| | | | |
|---|---|---|---|
| 2,347,496 | 4/44 | Muskat et al. | 23—202 |
| 2,828,187 | 3/58 | Evans | 23—202 |
| 2,855,273 | 9/58 | Evans et al. | 23—202 |
| 2,937,928 | 5/60 | Hughes et al. | 23—202 |
| 3,043,657 | 7/62 | Hughes et al. | 23—202 |
| 3,097,923 | 7/63 | Arkless | 23—202 |
| 3,147,077 | 9/64 | Callow et al. | 23—202 |

FOREIGN PATENTS 541,343  11/41  Great Britain.

OTHER REFERENCES

McPherson and Henderson book, "A Course in General Chem.", third ed., 1927, pages 396–398, 567, 665. Ginn and Co., New York, Personal copy in Div. 59.

MAURICE A. BRINDISI, *Primary Examiner.*